Feb. 21, 1933. W. L. ZINK 1,898,114
POWER TAKE-OFF SAFETY DEVICE
Filed Jan. 25, 1932
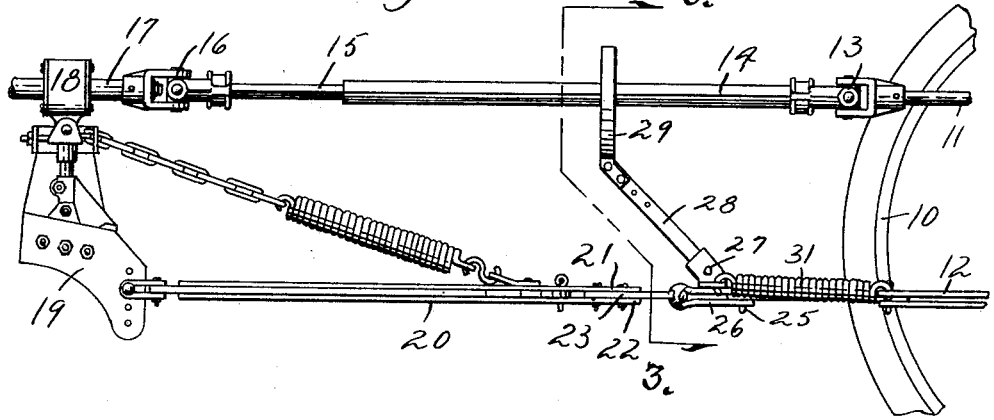
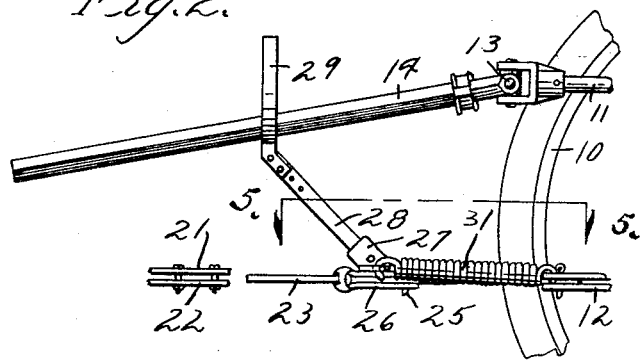
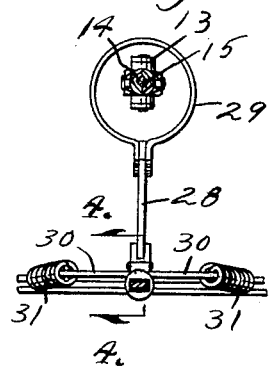
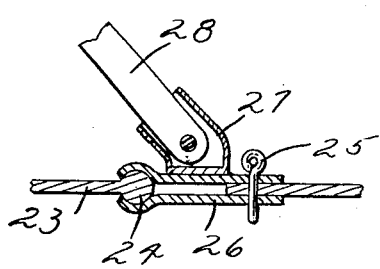
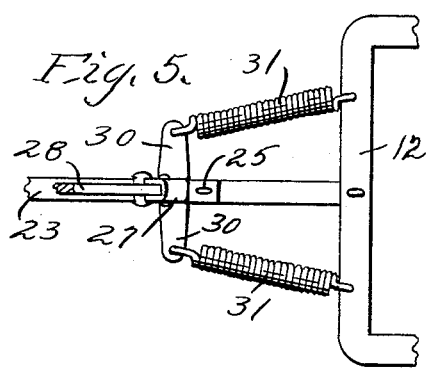
Inventor
W. L. Zink
by Ostwig & Hague Att'ys Patented Feb. 21, 1933

1,898,114

UNITED STATES PATENT OFFICE

WILLIAM L. ZINK, OF AURORA, ILLINOIS

POWER-TAKE-OFF SAFETY DEVICE

Application filed January 25, 1932. Serial No. 588,802.

In connection with the use of tractor drawn plows and the like, it is customary to provide a draw bar connection between the two implements, so arranged that when, for instance, the plow should strike a heavy obstruction, the draw bar will disconnect from the tractor to prevent injury to the implements.

When a pulverizer attachment is used on the plow, such for instance as that disclosed in the patent to Davidson, Number 1,697,679, issued January 1, 1929, then it is necessary to provide a connection between the power-take-off of the tractor and the power shaft of the pulverizer attachment through which power can be transmitted from the tractor to the pulverizer, and obviously there must be means for permitting this power shaft connection to become separated just like the draw bar when the plow meets a heavy obstruction.

Heretofore with devices of this kind it has been found that when the power shaft connection becomes separated, the end thereof adjacent to the tractor will, when the power-take-off is rotated, move to a position substantially at right angles to the power-take-off shaft on account of centrifugal action and rapidly whirl about and injure the tractor or its operator.

The object of my invention is to provide a device of simple, durable and inexpensive construction to be applied to and carried by the draw bar of the plow, and which includes a ring-like structure surrounding the slip tube of the power-take-off, and so arranged that when the slip tube is disconnected from the said shaft, said tube will be held in a position approaching alinement with the power-take-off shaft, so it cannot be thrashed about and injure the machinery or operator when the power-take-off shaft is being rotated after the slip tube is disconnected.

In this connection it is my object to provide means whereby this ring-like structure will move laterally, following the lateral movement of the slip tube when the tractor is turning around, so that a comparatively small ring may be used, and which will not interfere with the turning action of the tractor.

A further object is to provide means for automatically bringing the ring-like structure to position substantially centered in alinement with the power-take-off shaft when the slip tube is disconnected during such time as the tractor is being turned around.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side elevation of a portion of a tractor and a power-take-off shaft with its universal joints, slip tube and slip shaft, and a portion of a plow having a power shaft connected with the slip shaft and a draw bar connecting the plow and the tractor, and illustrating my improved slip tube guide ring in position for use.

Figure 2 shows a side elevation of that portion of the device which is connected to the tractor with the slip tube resting in the slip tube guide ring.

Figure 3 shows a sectional view taken on the line 3—3 of Figure 1.

Figure 4 shows a sectional view taken on the line 4—4 of Figure 3; and

Figure 5 shows a plan view partly in section taken on the line 5—5 of Figure 2.

Referring to the accompanying drawing I have used the reference numeral 10 to indicate that portion of a tractor shown. It is provided with a power-take-off shaft 11 and a draw bar member 12. Connected to the power-take-off shaft is a universal joint 13 and a slip tube 14. Slidingly mounted in the slip tube 14 is the slip shaft 15 to the rear end of which is connected a universal joint 16, and a power shaft 17 is connected to the universal joint. This power shaft is mounted in a power shaft bearing 18 connected to the plow or other implement with which the device is used.

In the drawing I have shown only the clevis 19 of the plow or other implement. Connected to this clevis is a draw bar 20 having at its front end a detachable friction connecting device comprising upper and lower members 21 and 22 held together by bolts to receive between them a connecting member 23, and so arranged that the draw bar may disconnect at this point when excessive pull is applied to it. In front of this member 23 is a universal joint 24, which in turn is connected to the tractor frame. This connection is made detachable by means of a hitch pin 25 in the ordinary manner.

Mounted upon the draw bar member 26, which forms part of the universal joint 24, are two upwardly extended ears 27 spaced apart from each other and having pivotally mounted between them the arm 28, which extends upwardly and rearwardly. Adjustably fixed to the upper end of this arm 28 is a slip tube guide ring 29, which, when in proper position as shown in Figure 1, will be extended transversely of the slip tube, which latter is substantially centered within the ring.

When the draw bar is pulled apart at the friction joint it is desirable that the portion of the draw bar which connects to the tractor and which carries the slip tube guide ring be moved to position substantially in line fore and aft through the tractor, and for this purpose I have applied to the part 26 of the draw bar a cross arm 30, and to the ends of this draw bar I have connected springs 31 extended forwardly and slightly diverging and attached at their forward ends to the tractor frame.

In practical use, and assuming that the plow should strike an obstruction when the tractor is moving in a straight line forwardly, then the draw bar will separate in the manner described, and the slip shaft will draw out from the rear end of the slip tube and in the event that the power-take-off shaft is still rotating, the slip tube will be guided in its movements within the slip tube guide ring, and be thereby prevented from injuring any one upon the tractor or injuring any of the mechanism of the tractor or plow.

When the tractor and plow are being advanced and the tractor is being turned, then the ring substantially follows the turning movement of the slip tube, so that the ring may be made comparatively small, and this is due to the fact that the slip tube guide ring is fixed to and supported by the draw bar instead of the tractor.

Heretofore tractors have been provided with guide rings fixed to the tractor frame, but obviously guide rings thus fixed must be of very large diameters to thereby permit the necessary lateral movement of the slip tube when the tractor is being turned around, but by placing the guide ring upon the draw bar in the manner herein disclosed, a much smaller ring may be used, and the thrashing about movements of the slip tube may be greatly reduced.

Obviously by having the position of the guide ring adjustable relative to its supporting arm, similar guide ring devices may be quickly and easily adjusted to fit substantially all makes of tractors having power-take-off shafts, whereas at the present time it is necessary to provide a different size and shape of guide ring for each different tractor.

I claim as my invention:

1. In a device of the class described, the combination of a power-take-off shaft, a universal joint therein, a slip tube connected with the universal joint, a draw bar pivotally connected with the tractor, a slip tube guide ring carried by the draw bar and encircling the slip tube, and a spring device for normally moving the portion of the draw bar that is connected to the tractor to a position extended approximately straight rearwardly from the tractor, for the purposes stated.

2. In a device of the class described, the combination of a power-take-off device for a tractor, a universal joint at the rear end thereof, a slip tube connected to the universal joint, a draw bar having its forward end pivoted to the tractor, a universal joint between the ends of the draw bar, an arm pivoted to the draw bar in front of the universal joint, and a ring adjustably connected to said arm and held thereby in position substantially centered about the slip tube, for the purposes stated.

3. In a device of the class described, the combination of a power take off shaft, a universal joint at the outer end thereof, a driven shaft formed of two parts one being a slip tube and the other an angular shaft member slidingly and non-rotatably mounted in the slip tube, one of said driven shaft members being connected to said universal joint, a draw bar having one end designed to be attached to the implement which contains said power take off shaft and the other end to be attached to an implement drawn by the first mentioned implement, and a guard ring carried by said draw bar and movable with the draw bar laterally to follow the lateral movements of the said driven shaft, said ring being of such size as to be wholly out of engagement with the driven shaft and positioned to surround that part of the driven shaft which is connected to said universal joint, and whereby when the members of the driven shaft are disconnected during the time that the power take off shaft is rotating, the said ring will hold the driven shaft member which is connected to the universal joint against any substantial movement by centrifugal action away from its normal position.

Des Moines, Iowa, September 7, 1929.

WILLIAM L. ZINK.